United States Patent
He et al.

(10) Patent No.: US 12,147,361 B2
(45) Date of Patent: Nov. 19, 2024

(54) MEMORY OPERATING METHOD, MEMORY AND ELECTRONIC DEVICE

(71) Applicant: GIGADEVICE SEMICONDUCTOR INC., Beijing (CN)

(72) Inventors: Ze He, Beijing (CN); Nanfei Wang, Beijing (CN); Yingwu Zhang, Beijing (CN)

(73) Assignee: GIGADEVICE SEMICONDUCTOR INC., Beijing (CN)

(*) Notice: Subject to any disclaimer, the term of this patent is extended or adjusted under 35 U.S.C. 154(b) by 41 days.

(21) Appl. No.: 18/140,023

(22) Filed: Apr. 27, 2023

(65) Prior Publication Data

US 2024/0078200 A1 Mar. 7, 2024

(30) Foreign Application Priority Data

Sep. 5, 2022 (CN) .......................... 202211094978.X

(51) Int. Cl.
*G06F 13/16* (2006.01)
*G06F 13/18* (2006.01)

(52) U.S. Cl.
CPC ...... *G06F 13/1689* (2013.01); *G06F 13/1621* (2013.01); *G06F 13/18* (2013.01)

(58) Field of Classification Search
CPC .. G06F 13/1689; G06F 13/1621; G06F 13/18; G06F 13/1647; G06F 13/1657; G06F 2212/7201; G06F 2212/7208; G06F 2212/1024; G06F 12/0223; G06F 12/0238; G06F 12/0246
See application file for complete search history.

(56) References Cited

U.S. PATENT DOCUMENTS

| | | | | |
|---|---|---|---|---|
| 5,412,788 | A | * 5/1995 | Collins | .................. G06F 13/18 711/150 |
| 2010/0293348 | A1 | * 11/2010 | Ye | .......................... G06F 3/0679 711/170 |
| 2011/0289256 | A1 | * 11/2011 | Bartlett | ................ G06F 12/0855 711/3 |

* cited by examiner

*Primary Examiner* — Khoa D Doan
(74) *Attorney, Agent, or Firm* — IPro, PLLC

(57) ABSTRACT

Disclosed are a memory operating method, memory and electronic device. The memory complies with a read-write parallel protocol and includes a plurality of memory banks, and the method includes: sequentially mapping read and write transactions for consecutive logical addresses to different banks according to a predetermined transmission bit width by an address decoder, and arbitrating the read transaction and write transaction mapped to the same bank in a current clock cycle by an arbitration circuit, wherein in case that a specific low address bits of the logical address are the same, the read and/or the write transaction are mapped to the same bank. The disclosure avoids long-term occupation of a certain physical bank with specific low address decoding solution, thereby improving the execution efficiency of the read-write parallel protocol. Furthermore, an arbitration mechanism is introduced to arbitrate read and write conflicts for the same memory bank in each clock cycle.

20 Claims, 8 Drawing Sheets

MACRO 0
Logical address
| 00000 | 1ì 1 |
| 1<u>00</u>000 | 64bit data |
| 10<u>0</u>0000 | 64bit data |
| 11<u>00</u>000 | 64bit data |
| ⋮ | ⋮ |
| | aì a |
| | |

MACRO 1
Logical address
| <u>01</u>000 | 2ì 2 |
| 1<u>01</u>000 | 64bit data |
| 10<u>01</u>000 | 64bit data |
| 11<u>01</u>000 | 64bit data |
| ⋮ | ⋮ |
| | bì b |
| | |

MACRO 2
Logical address
| <u>10</u>000 | 3ì 3 |
| 1<u>10</u>000 | 64bit data |
| 10<u>10</u>000 | 64bit data |
| 11<u>10</u>000 | 64bit data |
| ⋮ | ⋮ |
| | cì c |
| | |

MACRO 3
Logical address
| <u>11</u>000 | 4ì 4 |
| 1<u>11</u>000 | 64bit data |
| 10<u>11</u>000 | 64bit data |
| 11<u>11</u>000 | 64bit data |
| ⋮ | ⋮ |
| | |
| | |

*FIG. 2*

MEMORY OPERATING METHOD, MEMORY AND ELECTRONIC DEVICE

CROSS-REFERENCE TO RELATED APPLICATIONS

This application claims priority to Chinese patent application No. 202211094978.X filed on Sep. 5, 2022, the disclosure of which is incorporated herein by reference in its entirety and for all purposes.

TECHNICAL FIELD

The disclosure herein relates to the field of memory, and in particular to a memory operation method, memory and electronic device.

BACKGROUND

Improving memory read and write efficiency has always been the direction of memory performance optimization. Compared with a serial protocol (for example, I2C) that can only perform read or write operation, a parallel read and write protocol for memory (for example, AXI) can further improve the interaction efficiency between the host and the memory.

However, since the memory in the prior art is selected to perform high address decoding, that is, each physical memory bank in the memory corresponds to a large continuous logical address range. For read/write requests with consecutive logical addresses, the aforementioned high address decoding method will map these consecutive logical addresses to one physical memory bank, resulting in large-scale blocking of these requests. And since one physical memory bank (for example, a physical SRAM slice) has only one physical access interface, it is impossible to read and write to the memory bank at the same time. In case that reading and writing in a continuous logical address range are requested at the same time, when both a read request and a write request are addressed to the same physical memory bank, the non-priority request needs to wait for the completion of the priority request before data access can be performed. This makes the read and write parallel become the actual read and write serial, thus lowering the read and write rate of the entire memory.

Thus, a method for improving memory read and write efficiency is needed.

SUMMARY

According to a first aspect of the present disclosure, a memory operation method is provided, the memory follows a read-write parallel protocol and includes a plurality of memory banks, the method comprising: sequentially mapping a read request for consecutive logical addresses to different memory banks according to a predetermined transmission bit width by a read address decoder; sequentially mapping a write request for consecutive logical addresses to different memory banks according to the predetermined transmission bit width by a write address decoder; and arbitrating the read request and the write request mapped to the same memory bank in the current clock cycle by a arbitration circuit, wherein, in case that the specific low address bits of the logical addresses are the same, the read request and/or the write request are mapped to the same memory bank.

According to a second aspect of the present disclosure, a memory is provided, the data access of the memory follows a read-write parallel protocol, and the memory includes: a plurality of memory banks; a read address decoder configured to sequentially map a read request for consecutive logical addresses to different memory banks; a write address decoder configured to sequentially map a write request for consecutive logical addresses to different memory banks; an arbitration circuit configured to arbitrate the read request and the write request mapped to the same memory bank in the current clock cycle, wherein, in case that the specific low address bits of the logical addresses are the same, the read request and/or the write request are mapped to the same memory bank.

According to a third aspect of the present disclosure, an electronic device is provided, the electronic device comprising: a control unit; and a memory, wherein the interaction between the control unit and the memory follows a parallel read-write protocol, and the memory performs the operation according to the first aspect of the present disclosure.

BRIEF DESCRIPTION OF FIGURES

The above and other objects, features and advantages of the present disclosure will become more apparent by describing the exemplary embodiments of the present disclosure in more detail with reference to the accompanying drawings, wherein, in the exemplary embodiments of the present disclosure, the same reference numerals generally represent same parts.

FIG. 2 shows a memory implementation example including multiple memory banks based on low address mapping according to the present disclosure.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A memory usually includes multiple memory banks. For example, an SRAM with a capacity of 512 k can be divided into 4 "slices" of physical memory banks, that is, four Macros (Macro 0~3), and each Macro has a storage capacity of 128 k. Each memory bank includes multiple memory units, and each memory unit include multiple memory cells (for example, a cell storing "0" or "1").

Figure 1:
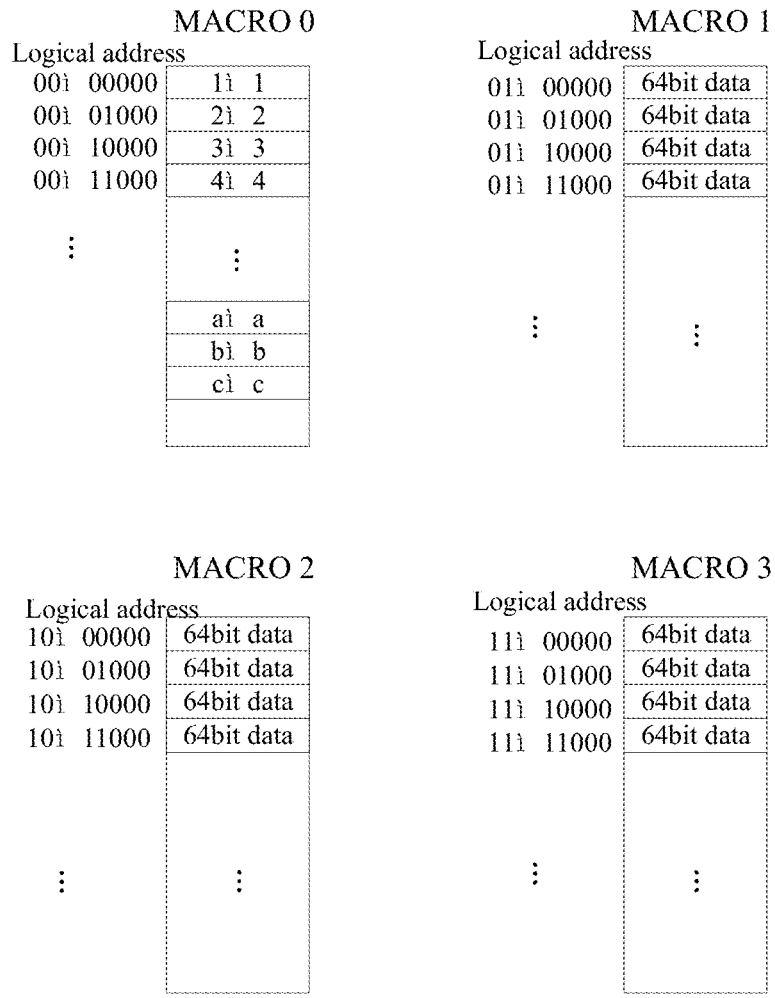
FIG. 1 shows an implementation example in which a memory includes multiple memory banks based on high address mapping.

FIG. 1 shows an implementation example in which a memory includes a plurality of memory banks based on high address mapping. As shown, the memory includes four memory banks Macro 0~3, and each memory bank has the same storage capacity, for example, 128 k (i.e., 128 KB). Each memory bank includes a plurality of memory units, for example, a memory unit with a size of 64 bits (that is, 8 bytes) shown in the figure, and each memory unit includes 64 minimum memory units. The size of the memory unit can usually be set. In one embodiment, the memory communicates with a control unit (that is, a host, not shown in FIG. 1) through a bus conforming to the read-write parallel protocol, and the bit width of the memory unit of the memory bank can be set to correspond to the physical bus width. In other embodiments, each memory bank (Marco) can be composed of n physical memory banks, and the physical bus bit width of the bus is n*64 bits.

In the prior art, high address decoding is used. That is, the 4 Macros 0~3 respectively correspond to 4 consecutive logical address ranges, and the upper 16 bits of the address are represented by hexadecimal numbers as 0x2000 (the corresponding continuous logical address range is 0x2000,0000~0x2000,ffff), 0x2001 (the corresponding continuous logical address range is Marco 0x2001,0000~0x2001,ffff), 0x2002 (the corresponding continuous logical address range is 0x2002,0000~0x2002,ffff) and 0x2003 (the corresponding continuous logical address range is 0x2003,0000~0x2003, ffff). In a read-write parallel protocol, a write operation to one bank is allowed while a read operation is performed on a different bank, but simultaneous read and write operations (e.g., within one clock cycle) of one bank are not allowed.

Therefore, when high address decoding is performed, the 8 consecutive logical addresses in the above example correspond to the same Macro. For example, when a continuous read operation for these 8 consecutive logical addresses occurs, the Macro needs to be continuously occupied. During the occupancy, in case that a write request for the Macro occurs, it is necessary to wait for the current read operation to end, thereby reducing the overall parallelism efficiency of the memory.

As shown in FIG. 1, the size of a memory unit is 64 bits, and the continuous physical addresses in each Marco correspond to continuous logical addresses (as mentioned above, the interval between continuous logical addresses is 8), the only difference is that the high 16-bit address of Macro 0~3 corresponds to 0x2000, 0x2001, 0x2002, and 0x2003 in hexadecimal, that is, the high data bits [17:16] of the logical address are 00, 01, 10, and 11 in binary as shown in FIG. 1, respectively.

When addressing consecutive logical addresses (for example, the lower 8-bit address [7:0] is represented as 00, 08, 10, 18 in hexadecimal) to read data "1 . . . 1; 2 . . . 2; 3 . . . 3; 4 . . . 4", as shown, read the first four memory cells of Macro 0 occupied by the data. Since the read-write parallel protocol allows simultaneous reading and writing of different memory banks of the memory, for example, while writing Macro 0, the data of Macro 2 can be read at the same time, but simultaneous reading and writing of the same memory bank is not allowed (due to a physical bank has only one physical access interface), so one of the read and write requests simultaneously addressing the same bank will be delayed. For example, while reading data "1 . . . 1; 2 . . . 2; 3 . . . 3; 4 . . . 4", when it is requested to write data "a . . . a; b . . . b; c . . . c" (hex representation) to an address within the range of 0x2000,0000~0x 2000,ffff, the write request has to wait for the completion of reading data, because simultaneous reading and writing on the same Macro will cause conflicts. Assuming that the memory completes a "transfer" data access every clock cycle, when the above read request and write request arrive at the same time, the write request needs to wait for at least 4 cycles (that is, the end of the read operation) until data "a . . . a; b . . . b; c . . . c" can be written to the specified address on Marco 0. When such read-write conflicts occur frequently, the overall read-write efficiency of the memory will be greatly reduced.

Therefore, this disclosure proposes a solution that can improve the efficiency of memory read and write. With a specific low address decoding, the incremental address is mapped to different memory banks, so that concurrent read and write requests can be staggered to different memory banks. For read and write conflicts, an arbitration circuit can be used for conflict arbitration, and by delaying, for example, a write operation by one cycle (here, one clock cycle can be called "one beat"), subsequent read and write operations can proceed smoothly. During the read or write operation, when delays occur for various reasons (for example, in a memory that supports ECC encoding, due to unaligned write data that causes ECC re-encoding, a read-modify-write operation is required, so it takes at least two beats to complete; but it is worth noting that not all unaligned writes need to be completed in multiple beats, for example, unaligned writes can be completed in one beat without modifying the ECC), finer-grained arbitration can be provided to ensure efficient utilization of each cycle (for example. In the AXI protocol, arbitration is performed once per transfer).

FIG. 2 shows a memory implementation example including a plurality of memory banks based on low address mapping according to the present disclosure. As shown, the memory can also include four memory banks Macro 0~3, and each bank have the same storage capacity, for example, 128 k (i.e., 128 KB). Each bank also includes a plurality of memory units, such as the memory unit shown in the figure with a size of 64 bit (8 byte), that is, the physical bit width of the bus communicating between the memory and the control unit (not shown in FIG. 2) is 64 bits, wherein the memory is the slave of the bus, and the control unit is the master of the bus.

For the consideration of aligning the physical bit width of the above-mentioned bus, consecutive logical address accesses are usually coded at intervals of 8 byte data (the minimum addressing unit of logical address is 1 byte data), for example, the low 8-bit of the 8 consecutive logical addresses are 0x00, 0x08, 0x10, 0x18, 0x20, 0x28, 0x30, 0x38. respectively (each 4-bit is represented by a hexadecimal number, 0x represents hexadecimal), and when the aforementioned logical address is represented by a binary number, the address bits of the low 8-bit [7:0] are: 0b'00000000, 0b'00001000, 0b'00010000, 0b'00011000, 0b'00100000, 0b'00101000, 0b'00110000, 0b'00111000 (0b' means binary).

Different from the prior art, the memory of the present disclosure adopts specific low address decoding. That is, the Macro 0~3 no longer respectively correspond to 4 consecutive logical address ranges, but the continuous logical addresses are transmitted with a predetermined transmission bit width (for example, the address interval as shown is 8, since the minimum addressing unit of the logical address is 1 byte of data, 8 addressing units between 2 consecutive logical addresses means that the corresponding data interval is 8 bytes, that is, 64 bit data) and mapped to different memory banks in turn.

Specifically, the capacity of each of Macro 0~3 is 128 k, but in each Macro, the logical address between adjacent physical addresses is no longer a continuous address with an interval of 8 addresses, but a discontinuous address with an interval of 32 addresses address (Predetermined transmission bit width 8×number of memory banks 4=32). Therefore, when addressing four consecutive logical addresses (for example, the lower 8-bit address is expressed as 00, 08, 10, 18 in hexadecimal) to read data"1 . . . 1; 2 . . . 2; 3 . . . 3; 4 . . . 4 (hexadecimal representation)", with the specific low address decoding, in this embodiment is the low address bits [4:3], Macro 0, Macro 1, Macro 2, and Macro 3 are addressed respectively (in FIG. 2, Marco 0 corresponds to "00", Marco 1 corresponds to "01", Marco 2 corresponds to "10", and Marco 3 corresponds to "11"). Therefore, when the memory receives a request to read data of 4 increment address starting from logical address 0000, the read data channel can for example, read "1 . . . 1" stored on Macro 0 in the first cycle, read "2 . . . 2" stored on Macro 1 in the second cycle, read "3 . . . 3" stored on Macro 2 in the third, and read "4 . . . 4" stored on Macro 3 in the fourth cycle, so the data can be combined into "1 . . . 1; 2 . . . 2; 3 . . . 3; 4 . . . 4 (hexadecimal representation)" according to the big-endian rule and read out.

When a request to read data of 4 increment address starting from logical address 00000 is received, at the same time as a request to write data "a . . . a; b . . . b; c . . . c" to 3 memory units starting from logical address . . . 1 . . . 01000 (corresponding to an address of Macro 0), the arbitration circuit can arbitrate a read request and a write request for the same memory bank in the same clock cycle, for example, the arbitration circuit can arbitrate the read request first(in other arbitration rules, it can also be a write request first), and make the write transfer in the write request delayed by one clock cycle, so that the subsequent read and write operations can be staggered for different memory banks when the logical addresses of the read and write operations are continuous. Therefore, the read data channel can still read "1 . . . 1" stored on Macro 0 in the first cycle, read "2 . . . 2" stored on Macro 1 in the second cycle, read "3 . . . 3" stored on Macro 2 in the third cycle, and read "4 . . . 4" stored on Macro 3 in the fourth cycle; meanwhile, write data channel can be delayed by a beat in the first clock cycle, and then write "a . . . a" to Macro 0 in the second cycle, write "b . . . b" to Macro 1 in the third cycle, and write "c . . . c" to Macro 2 in the fourth clock cycle. Thus, efficient read and write parallelism is realized through one-beat delay of the write request (that is, data read and write operations are simultaneously performed on different Macros during the second to fourth clock cycles). Of course, it should be understood that when a request to read the data of 4 units starting from logical address 00000 is received at the same time as a request to write "b . . . b; c . . . c" to 2 logical addresses starting from . . . 1 . . . 01000, there is no need to delay, because there is no reading and writing of the same memory bank in the same clock cycle.

It is worth noting that the foregoing embodiments all take the "predetermined transmission bit width" as an example of 64 bit. In other embodiments, other "predetermined transmission bit widths" can also be used, such as 32 bit (assuming that the bus physical bit width is 32 bit=4 byte), then the data interval between two consecutive logical addresses is 4 bytes of data, that is, there is an interval of 4 addressing units between two consecutive logical addresses (assuming that the addressing unit of the logical address is still 1 byte of data), then the "specific address low bit" is the address low data bit [3:2] (assuming that the memory still includes 4 memory banks).

Figure 3:
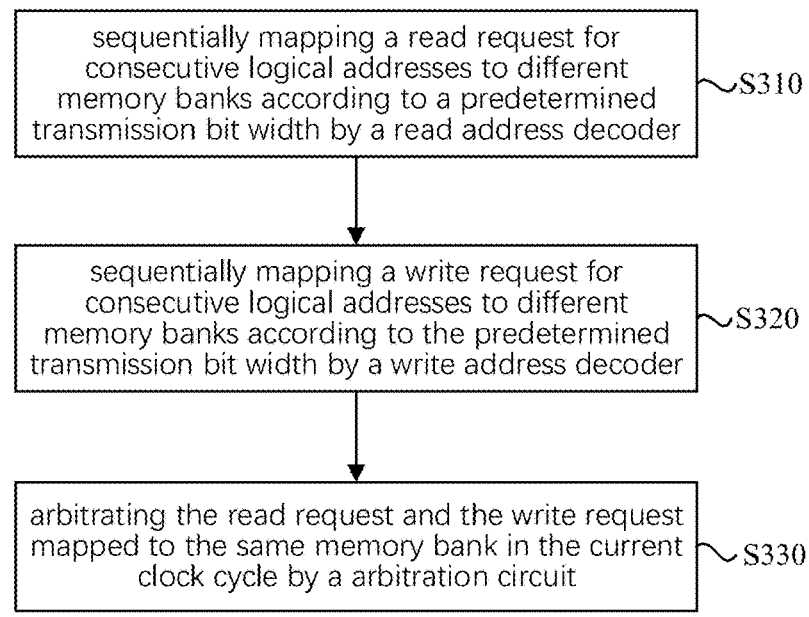
FIG. 3 shows a schematic flowchart of a memory operation method according to an embodiment of the present disclosure.

FIG. 3 shows a schematic flowchart of a memory operation method according to an embodiment of the present disclosure. The memory capable of implementing the memory operation method of the present disclosure follows a read-write parallel protocol (for example, the AXI protocol described in detail below) and includes a plurality of memory banks.

In step S310, a read request for consecutive logical addresses is sequentially mapped to different memory banks according to predetermined transmission bit width by a read address decoder. In step S320, a write request for consecutive logical addresses is sequentially mapped to different memory banks according to the predetermined transmission bit width by write address decoder. That is, the memory of the present disclosure adopts low address decoding as shown in FIG. 2, also called low data bit address decoding. In the example in FIG. 2, the predetermined transmission bit width is 64 bit (8 byte), that is, continuous logical addresses are sequentially mapped to different memory banks one by one (in common cases, the logical addresses are aligned with the predetermined transmission bit width, and the interval between consecutive logical addresses is 8 addressing units; for example, in the case of unaligned writing of logical addresses, the interval between adjacent logical addresses can be less than 8 addressing units; in this case, adjacent logical addresses will also be mapped to the same memory bank). When the data of 4 memory units corresponding to consecutive logical addresses (for example, the low 8 bit address is expressed as 00, 08, 10, 18 in hexadecimal) needs to be read (that is, 4×64 bit=256 bit), four Macros starting from the Macro corresponding to the start address need to be accessed. In other embodiments, continuous logical addresses can not be mapped one by one, for example, data can be stored in two-by-two intervals. Thus, when the data of 4 memory units corresponding to consecutive logical addresses (for example, the low 8 bit address is expressed as 00, 08, 10, 18 in hexadecimal) needs to be read (that is, 4×64 bit=256 bit), the Macro corresponding to the start address needs to be read the data of two memory units, and then a subsequent Macro needs to be read another data of two memory units.

When consecutive logical addresses are sequentially mapped to different memory banks one by one, reading or writing of data of a memory unit can be completed in one clock cycle. When every two or three consecutive logical addresses are sequentially mapped to different memory banks, more clock cycles are required to complete the data access for one Macro, and then access the next Macro. Therefore, it is preferable that consecutive logical addresses are sequentially mapped to different memory banks one by one to reduce scheduling difficulty and maximize read-write parallelism.

Here, in an embodiment where parallel reading and writing is required, the address decoder includes a read address decoder and a write address decoder (also referred to as a read request address decoder and a write request address decoder). The read address decoder is configured to convert the logical address in the received read request into a physical address, and select the memory bank to be addressed according to the value of specific low-order data in the logical address; Similarly, the write address decoder is configured to convert the logical address in the received write request into a physical address, and select the memory bank to be addressed according to the value of specific low-order data in the logical address.

In actual operation, the address decoder can determine the memory bank to be mapped according to the values of the specific low address bits of the read request address and the write request address, wherein the lowest bit of the specific low address bits is determined with a predetermined transmission bit width, and the number of specific low address bits is determined according to the number of memory banks.

In the example where the predetermined granularity is 8 (the minimum addressing unit is 1 byte data, the number of addressing units that differ between consecutive logical addresses determined by the predetermined transmission bit width of 64 bit is 8) is sequentially mapped to Macro 0~3, the address decoder determines the memory bank to be mapped according to the value of the specific low address bits [4:3] of the request address. Here, the lowest bit [3] of the specific low address bits corresponds to a predetermined granularity of 8 (that is, the predetermined bit width is 64 bits), and the low address bits [4:3] occupying two bits corresponds to the number of memory banks of 4. When the interval between consecutive logical addresses is 4 (that is, when the predetermined granularity is 4), and in the example of sequentially mapping to two memory banks, the address decoder determines the memory bank to be mapped according to the value of the specific low address bits [2] of the request address (at this time, 4 determines that the lowest bit of a specific low address bit is [2], and two memory banks determine that the number of bits is 1). In the implementation of high address decoding in FIG. 1, the lowest bit of the high address that decides to access the memory bank is determined by the size of each memory bank. The size of a memory bank is usually much larger than the predetermined transmission bit width, which is also the origin of the relative concept of "high" and "low" in high address decoding and low address decoding.

In addition, it can be understood that in actual operation, the address decoding of step S310 for the read request and the address decoding of step S320 for the write request can be executed as follows according to the sequence of read and write instructions from the master: step S310 is executed prior to step S320 is executed, and step S320 is executed prior to step S310, or steps S310 and S320 are executed concurrently.

In step S330, the arbitration circuit performs arbitration on the read request and the write request mapped to the same memory bank in the current clock cycle. In the present disclosure, in case that certain low address bits of logical addresses are the same, the read request and/or the write request are mapped to the same memory bank. It can be seen from the above that by alternately mapping logical addresses to multiple memory banks, it is possible to avoid multi-beat occupation of the same memory bank when the logical addresses are continuously read or written. And when the logical addresses of the read request and the write request in the current clock cycle are staggered and mapped to different memory banks, the read request and the write request can be executed in parallel in the current clock cycle. However, when there is a read request and a write request for one memory at the same clock cycle, an arbitration mechanism needs to be introduced to determine how to operate when the read and write requests conflict.

In the embodiment in which only one read and one write can be performed in parallel in the same clock cycle, only one arbitration circuit can be provided for one memory. In the present disclosure, preferably, one arbitration circuit is provided for each memory bank (for example, see FIGS. 4 and 5 which will be described in detail below).

Therefore, when the read request and the write request are mapped to the same memory bank in the current clock cycle, the arbitration circuit corresponding to the memory bank can arbitrate which operation the memory bank performs in the current clock cycle. Specifically, the arbitration circuit arbitrates the priority execution of the read request or the write request, and delays the non-prioritized request by a transmission time corresponding to the predetermined transmission bit width data (since the predetermined transmission bit width usually corresponds to the bus physical bit width, therefore, the transmission time corresponding to a predetermined transmission bit width data usually corresponds to one beat), so that the subsequent operations of reading and writing of continuous logical addresses can be staggered.

In the case that the predetermined transmission bit width is 8 bytes (i.e., 64 bits) and corresponds to the physical bit width of the bus, the delay is one clock cycle, that is, "one beat". In the case where every two consecutive logical addresses are sequentially mapped to different memory banks, the delay is two clock cycles.

For example, the arbitration circuit 0 of Macro 0 arbitrates the read request (for example, the read of 4 memory cell data "1 . . . 1; 2 . . . 2; 3 . . . 3; 4 . . . 4") first in the first clock cycle, and makes the write request (for example, the write of 3 memory cell data "a . . . a; b . . . b; c . . . c") delayed by one clock cycle, so that the read request completes the data reading of Macro 0~3 one by one in the first to fourth cycles, and the write request completes the data reading of Macro 0~2 one by one in the second to fourth cycle.

Since each read request or write request is usually an operation for multi-bit data of continuous logical addresses, that is, in the low address decoding implementation of the present disclosure, it is necessary to sequentially read or write multiple memory banks. Therefore, the granularity of the arbitration operation needs to be specified.

In one embodiment, an arbitration is performed for each read request or write request (for example, corresponding to a transaction in the AXI protocol), so that subsequent read and write operations can be staggered. However, in many cases, the operation for a certain address can be delayed. Therefore, in a preferred embodiment, a more fine-grained arbitration mechanism is required.

At this time, the read request or write request is a transaction of a read-write parallel protocol (here, for example, the AXI protocol), each read request includes multiple read transfers, and each write request includes multiple write transfers, and the arbitration circuit performs read/write arbitration for each memory bank during each read transfer and each write transfer. Therefore, in one embodiment, when the data of a transfer (for example, in the AXI protocol, a transfer (data transfer)) needs to be transferred, the arbitration circuit is configured to perform arbitration to a read transfer and a write transfer for the same memory bank at the same clock cycle.

In actual implementation, the request delay can be realized by notifying the request control circuit by the arbitration circuit. Therefore, the arbitration circuit arbitrates one of the read request and the write request first and makes the non-first request delay the transmission time for transmitting corresponding to a predetermined transmission address bit width, including: the arbitration circuit notifies the control module of the non-first transfer of the arbitration result; and the control module of the non-first transfer re-sending the transfer in the next transmission time for transmitting corresponding to a predetermined transmission address bit width (usually one beat). For example, the arbitration circuit arbitrates to delay the write operation by one beat in the first clock cycle, and notifies the write control module of the memory of the arbitration result. The write control module can repeat the operation of the first cycle in the second clock cycle, that is, re-send the same write request to Macro 0, thereby realizing a one-beat delay for one of the conflicting transfers.

In order to facilitate the understanding of the present disclosure, the arbitration principle of the present disclosure will be described in conjunction with a schematic diagram of a memory module as follows.

Figure 4:
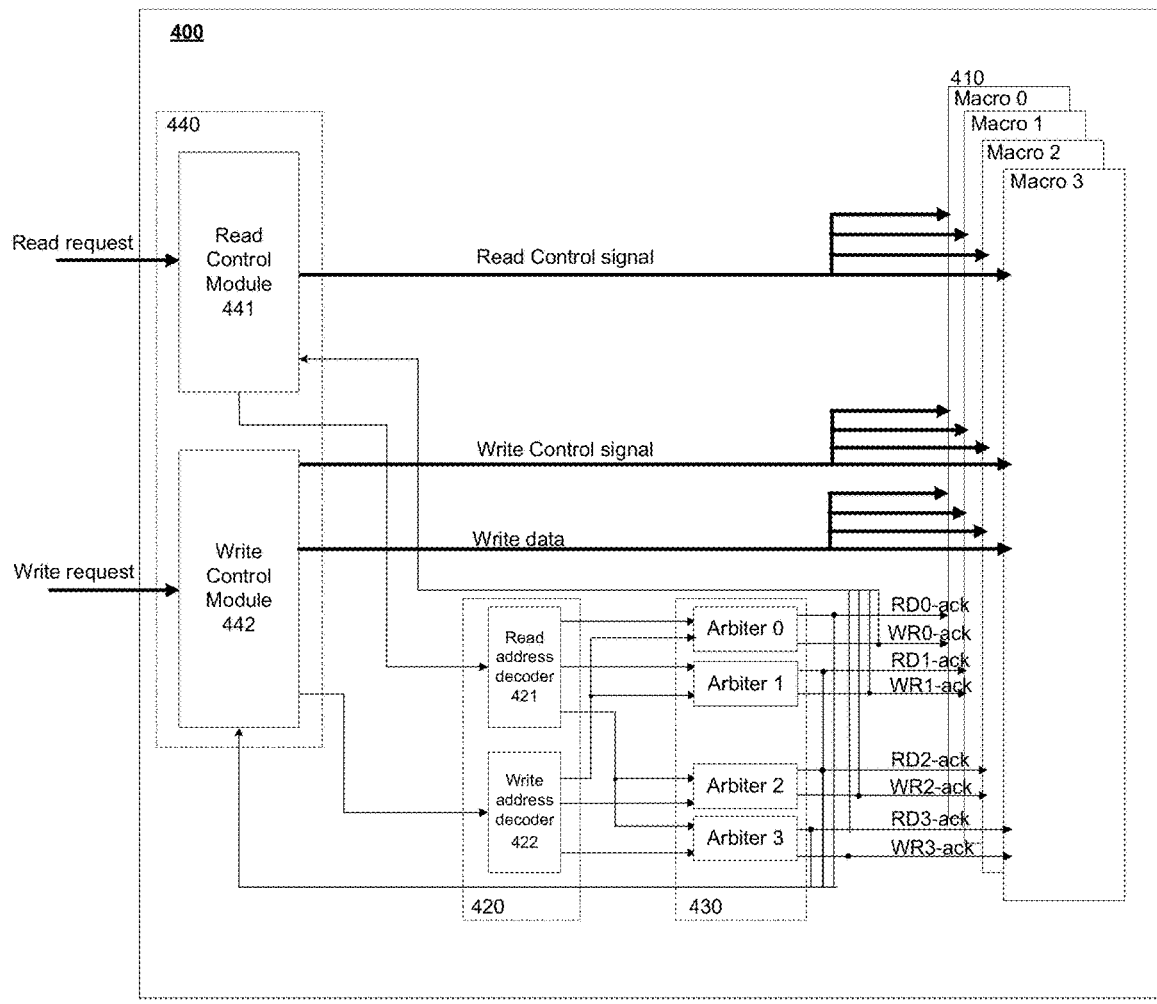
FIG. 4 shows a schematic composition diagram of a memory circuit according to an embodiment of the present disclosure.

FIG. 4 shows a schematic composition diagram of a memory circuit according to an embodiment of the present disclosure. The memory circuit 400 includes a plurality of memory banks 410 corresponding to the Macros 0-3 shown, and the data access of the memory circuit 400 follows a read-write parallel protocol, such as the AXI protocol. Allowing reading and writing in parallel means allowing simultaneous data reading and writing to the memory 400 within the same clock cycle, but the simultaneous reading and writing needs to be performed for different memory banks, that is, reading and writing in parallel is still not allowed in Read and write to the same memory bank simultaneously in the same clock cycle.

The memory circuit 400 also includes an address decoding circuit 420. In order to realize parallel read and write, the address decoding circuit 420 includes a read address decoder 421 and a write address decoder 422. The read address decoder 421 is configured to sequentially map a read request for consecutive logical addresses to different memory banks according to a predetermined transmission bit width. The write address decoder 422 is configured to map a write request for consecutive logical addresses to different memory banks according to the predetermined transmission bit width.

The memory circuit 400 of the present disclosure further includes an arbitration circuit 430 configured to arbitrate a read transfer and a write transfer to the same memory bank at the same clock cycle. The arbitration circuit 430 is configured to be connected between the address decoding circuit 420 and the memory bank 410, and before sending the read and write requests output by the address decoding circuit 420 to a specific memory bank, it performs arbitration on whether to read or write first.

In the illustrated example, the arbitration circuit 430 includes a plurality of arbitration sub-circuits corresponding to a plurality of memory banks, that is, Arbiter 0 configured to arbitrate the read and write access of Macro 0, Arbiter 1 configured to arbitrate the read and write access of Macro 1, Arbiter 2 configured to arbitrate for read and write access of Macro 2, and Arbiter 3 configured to arbitrate for read and write access of Macro 3.

For example, when Arbiter 0 receives a read request for Macro 0 from read address decoder 421 and a write request for Macro 0 from write address decoder 422 at the same time in the current clock cycle, Arbiter 0 can, according to a predetermined arbitration rule, perform arbitration on whether Macro 0 performs a read transfer or a write transfer in the current clock cycle. As shown, when the arbitration result is to perform a read transfer, Arbiter 0 sends RD0-ack to Macro 0, that is, a read transfer notification for Macro 0; and when the arbitration result is to perform a write transfer, Arbiter 0 sends WR0-ack to Macro 0, that is, write transfer notification for Macro 0. Similarly, Arbiter 1~3 can also send RD-ack or WR-ack to Macro 1~3 respectively to inform the arbitration result.

Therefore, a read or write data transfer can be directly performed on the memory bank in the current clock cycle according to the arbitration result. In the illustrated example, the control module 440 controls reading and writing to the memory bank. The control module 440 includes a read control module 441 and a write control module 442. The read control module 441 is configured to send a read control signal to the memory bank 410, and the write control 442 is configured to send a write control signal and the data to be written to the memory bank 410. data. In the implementation of using RD-ack or WR-ack to notify the arbitration result, the read control signal sent by the read control module 441 can be strobed by the memory bank that received RD-ack, for example, the memory bank Macro 1 that received RD-ack 1, and the write control signal and write data sent by the write control module 442 can be strobed by the memory bank that receives the WR-ack, for example, the memory bank Macro 0 that receives the RD-ack 0. Thus, parallel reading and writing of data (for different memory banks) can be completed in the current clock cycle.

In order to enable the normal execution of the delayed request based on the arbitration result, it is necessary to notify the control circuit 440 of the arbitration result, so that the delayed request can be transmitted at the next predetermined transmission bit width transmission time (usually the next cycle of the current clock cycle). Therefore, when the arbitration circuit 430 arbitrates a read request first or a write request first for a certain memory bank in the current clock cycle, the arbitration circuit 430 can notify the control circuit 440 of the arbitration result, and can only notify the read control module or the write control module, and notify both. Correspondingly, the read control module or write control module corresponding to the non-first request re-sends the non-first request in the next clock cycle. For example, there are a read request and a write request for Macro 0 simultaneously in the current clock cycle, Arbiter 0 sends RD0-ack to Macro 0, and Macro 0 receives a read control signal from read control module 441 and executes a read operation. Meanwhile, the RD0-ack can be sent to the write control module 442, so that the write control module 442 knows that the write control signal and the write data sent by the Macro 0 in the current clock cycle are not processed by the Macro 0, so in the next clock cycle, the write control module 442 re-sends the write control signal and write data delayed in the current cycle.

The arbitration circuit can perform arbitration according to a predetermined arbitration rule. For example, since the write operation may include time delay, when there are a read request and a write request for the same memory bank in the current clock cycle, the arbitration circuit will arbitrate the read request first.

In addition, in order not to delay a certain type of request for too long, when there are a read request and a write request for the same memory bank in the current clock cycle, the arbitration circuit arbitrates the request of a different type from the data transfer in the previous clock cycle. For example, when the arbitration sub-circuit for a certain memory bank did not make a read/write arbitration in the previous clock cycle, it can arbitrate the read request first in the current clock cycle; while, when a read/write arbitration has been made in the previous clock cycle, the arbitration sub-circuit no longer simply arbitrates the read request first in the current clock cycle, but a type different from the previous arbitration first. That is, in case that a write operation is arbitrated in the previous clock cycle, a read operation is arbitrated in the current clock cycle; in case that a read operation is arbitrated in the previous clock cycle, a write operation is arbitrated in the current clock cycle. In some embodiments, the arbitration subcircuit can also arbitrate a read request or a write request came alone, for example, when only a read request is received, the arbitration arbitrates the read operation first and sends RD-ack; only when a write request is received, the arbitration arbitrates the write operation first and sends a WR-ack.

The above arbitration rules are especially applicable to the case of arbitration at a smaller granularity, for example, each transfer in the AXI protocol is arbitrated once, thereby maximizing the parallelism rate of read and write operations.

Figure 5:
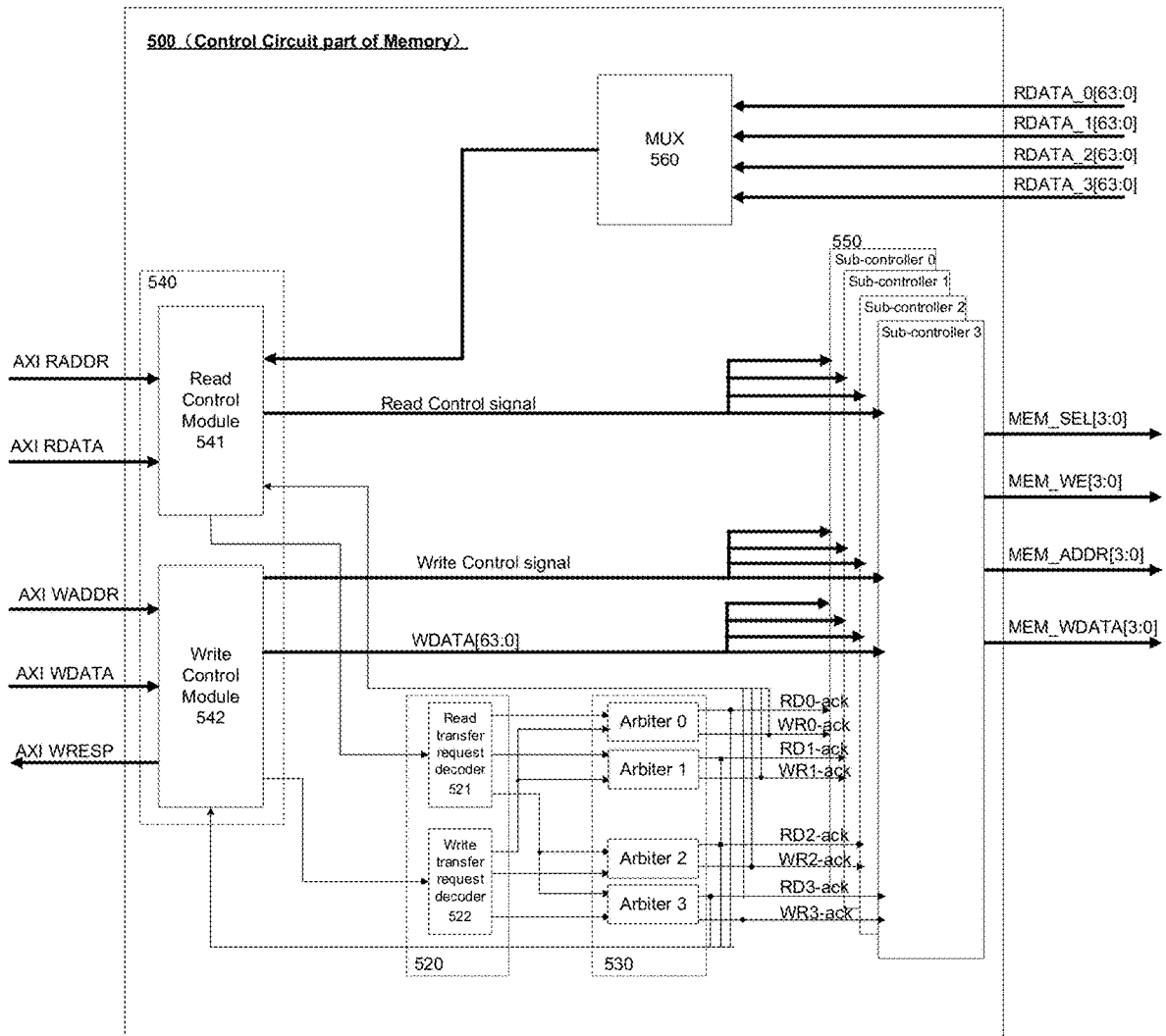
FIG. 5 shows a schematic composition diagram of a memory circuit conforming to the AXI protocol according to an embodiment of the present disclosure.

In order to further illustrate the principle of the present disclosure, an implementation example of the present disclosure will be given below in combination with a memory circuit complying with the AXI protocol. FIG. 5 shows a schematic composition diagram of a memory circuit conforming to the AXI protocol according to an embodiment of the present disclosure.

FIG. 5 shows the control circuit part of the memory 500, and the modules 520-560 can be regarded as control circuits for controlling the operation of the memory banks Marco 0-3. Similar to FIG. 4, the memory circuit 500 in FIG. 5 also includes an address decoding circuit 520, an arbitration circuit 530, and a control circuit 540. Further, the memory circuit 500 in FIG. 5 also shows a sub-controller circuit (sub-controllers) 550 connected between the control circuit and the memory banks and a multiplexing circuit (MUX) 560. The sub-control circuit 550 includes a plurality of sub-controllers 0-3, and each sub-controller is configured to control data writing and reading of a memory bank.

The AXI bus is connected between the master and the slave. The memory circuit in the present disclosure acts as a slave in the AXI protocol, receiving instructions from the master (e.g., CPU/DMA controller and other modules that need to access the memory 500) to perform data read or write operations. The AXI bus has 5 independent channels, which are write address (AXI WADDR) channel, write data (AXI WDATA) channel, write reply (AXI WRESP) channel, read address (AXI RADDR) channel, and read data (AXI RDATA) channel. Among them, the three channels (write address, write data and write reply) can interact with the write control module 542 in the control circuit 540, and the read address and read data channels can interact with the read control module 541 in the control circuit 540. Each channel supports bidirectional signaling for handshaking.

These five channels are independent of each other, but share a set of VALID/READY handshake mechanism to realize the transmission of information. The VALID/READY mechanism is a bidirectional flow control mechanism, which enables both the sender and the receiver to control the transmission rate. In the handshake mechanism, the communication parties act as the sender (Source) and the receiver (Destination) respectively, and the operations of the two are different. The sender sets the VALID signal high to indicate that the sender has already prepared the data, address or control information and kept them on the message bus. The receiver sets the READY signal high to indicate that the receiver is ready to receive. When the VALID/READY signals of both parties are high at the same time, a data transmission is completed on the rising edge of the clock ACLK. After all the data is transmitted, both parties simultaneously de-assert their own signals.

Figure 6A:
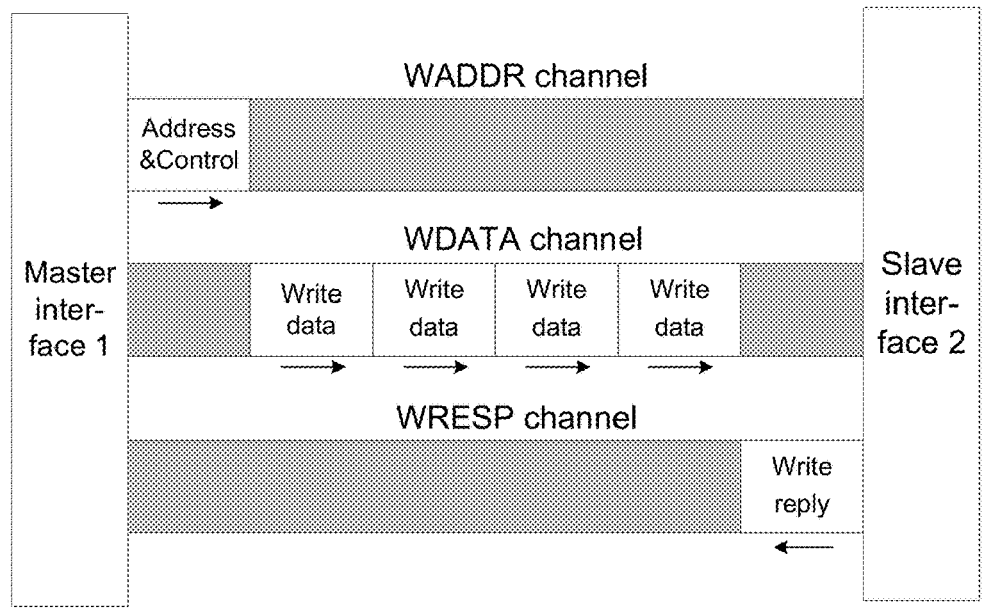
FIGS. 6A-B show schematic diagrams of channels in a write transaction and a read transaction in the AXI protocol.
Figure 6B:
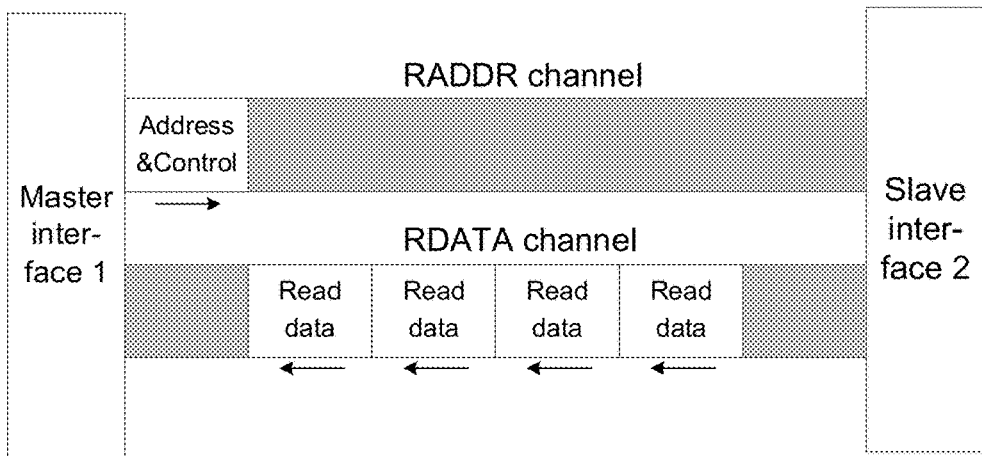

The unit of information exchange between the master and the slave is a "transaction". FIGS. 6A-B show schematic diagrams of channels in a write transaction and a read transaction in the AXI protocol. The master interface 1 in the figure can be, for example, an interface where a CPU is connected to a bus, and the slave interface 2 can be an interface where a memory circuit is connected to a bus.

First, FIG. 6A shows operations on three channels in a write transaction. As shown, the master first informs the slave of the characteristics of this transaction on the write address (WADDR) channel, including the write address of the data to be written and control information. Subsequently, the master can write data to the slave in the write data (WDATA) channel, and one transaction operation can include multiple data transfers, corresponding to multiple write data blocks in the figure.

After receiving all the write data of this transaction, the slave will notify the master of the response of this transaction operation through the write reply (WRESP) channel. The master receives the response signal from the slave as a sign of the end of this transaction. Write reply is for the whole transaction, not for each transfer. Writing data usually occurs after the write address operation, but the AXI protocol allows data to be written first or write data and address in the same clock cycle.

FIG. 6B shows operations on two channels in a read transaction. As shown, the master writes the address of the data to be read and control information in this transaction on the read address (RADDR) channel. After receiving the address, the slave transmits the data at the address to the master through the read data (RDATA) channel. It should be understood that the read address (RADDR) channel is still written by the master, but the content written is the address of the data to be read.

Since the transmission direction of the read data channel is from the slave to the master, the slave can directly use the read data channel for read reply after the read operation is completed, so there is no need for a separate read reply channel.

In the field of data transmission, "burst" refers to a transmission mode that continuously transmits multiple (adjacent addresses) data within a period of time. All interactions between two AXI components (master and slave shown in FIGS. 6A-B) to transfer a set of data are called AXI transactions. In an AXI transaction, data is organized in bursts. A burst can contain one or more transfers. Each transfer is also called a beat data because it uses one clock cycle. After the handshake signal between the two parties is ready, complete a transfer every cycle, so a AXI transfer is also called a AXI beat, or one beat data.

When the memory circuit of the present disclosure performs data transfer according to the AXI protocol, the predetermined transmission bit width can be set to a data size that can be transmitted in one transfer, for example, 8 bytes, i.e., 64 bits.

In a burst, the master can write information such as the start address and the length of the burst, and the slave will start from the start address and receive the write data transmitted by the master in turn, or read the data on consecutive addresses as read data to transmit to the master. Therefore, as shown in FIGS. 6A and 6B, one transaction includes one address and control information (Address & Control) and multiple data transfers.

In the whole transaction, the master first transmits control information and the address of the first byte of data (which is called the start address) for the next burst to the slave. During the subsequent transfer of this burst, the slave will calculate the address of the subsequent data according to the control information. Control information and start address are transmitted on the read/write address channel.

The control information transmitted in the address channel includes three burst-related signals. The control information in read and write address channels are consistent, thus the signals related to burst in the read address channel are described here.

(1) AxLEN (burst length): refers to the number of data transfers contained in a burst, which is controlled by the AxLen signal in the protocol. The AxLen signal in the protocol starts from zero, and the actual length value is AxLen+1.

(2) AxSIZE (burst size): refers to the data bit width in transmission, specifically, the number of bytes of data transmitted per cycle, which is controlled by the AxSIZE signal in the protocol. The data width of a burst cannot exceed the bit width of the data bus itself.

(3) AxBURST (Burst type), which is divided into 3 types, namely FIXED, INCR and WRAP. Use 2-bit binary representation.

The FIXED type is suitable for FIFO and cache application scenarios, and the most commonly used INCR type and WRAP type are used in this disclosure. In the INCR type and WRAP type, the address of the subsequent data is incremented on the basis of the start address, and the increment can usually be set to be the same as a transfer width (the WRAP type will loop back when it exceeds the boundary).

In order to perform efficient data access under the AXI protocol, the memory circuit of the present disclosure can set the predetermined transmission bit width to be the same as the data unit that can be transmitted by one AXI data transfer, that is, the maximum data that can be transmitted by one AXI data transfer (considering the existence of narrow bit width transfer), and the arbitration circuit performs read and write arbitration for each memory bank during each AXI data transfer. As a result, the master's access to continuous logical addresses changes to access different memory banks one by one. In the following examples of the present disclosure, it can be assumed that one AXI data transfer corresponds to a 64-bit (i.e., 8-byte) signal of one memory unit, i.e., the same as the predetermined transmission bit width.

Since under the AXI protocol, the read or write command from the master takes the form of start address+length to indicate the logical address to be accessed, so the address decoder can first determine which Macro the first transfer want to access through the target low address bits of the start address, and then perform address decoding by incrementally access different Marcos one by one. For example, when the slave receives the start address [4:3] from the RADDR channel as 10 (corresponding to Marco 2), and the control information includes INCR 4 (that is, the burst type is read address increment, and includes 4 transfers) instructions, the decoder can decode according to [4:3] of the start address, and increment the memory bank corresponding to the subsequent transfer one by one, so that the first transfer corresponds to Marco 2, and the second transfer corresponds to Marco 3, the third transfer corresponds to Marco 0, and the fourth transfer corresponds to Marco 1.

Specifically, the read address decoder can be implemented as the read transfer request decoder 521 shown in FIG. 5, which is configured to decode read request of each transfer. Thus, the read address decoder sequentially maps read requests of consecutive logical addresses to different memory banks with a predetermined transmission bit width include: read transfer request decoder 521 determine the memory bank to be accessed initially according to the specific low address bits of the start address in the read request, and incrementally determine the memory bank to be accessed in subsequent transfers one by one according to the transfer length information of the read request. Similarly, the write address decoder can be implemented as the write transfer request decoder 522 shown in FIG. 5, which is configured to decode write request for each transfer. Thus, the write address decoder sequentially maps write requests of consecutive logical addresses to different memory banks with a predetermined transmission bit width include: write transfer request decoder 522 determine the memory bank to be accessed initially according to the specific low address bits of the start address in the write request value, and incrementally determine the memory bank to be accessed in subsequent transfers one by one according to the transfer length information of the write request. Therefore, the memory circuit of the present disclosure realizes the staggered read and write operations for different memory banks in a burst transaction of multi-data transfers through an address mapping (mapped memory) strategy. In this strategy, consecutive logical addresses are alternately mapped to multiple memory banks in a unit of the data size that can be transmitted in one data transfer.

The memory circuit 500 is especially suitable to be implemented as an on-chip SRAM, and the modules 520-560 shown in FIG. 5 can be regarded as a control circuit of the on-chip SRAM. The numbers 0~3 in the right signal MEM_SEL[3:0], MEM_WE[3:0], MEM_ADDR[3:0] and MEM_WDATA[3:0] of the sub-control circuit 550 represent four sub-controllers 0~3, all of which are signals that conform to the timing of the SRAM read and write interface. These signals are sent by the sub-controller to the corresponding memory bank (i.e., Marco 0~3), so that it can complete efficient read and write under the control of the read and write control circuit 540 and the arbitration of the arbitration circuit 530. MUX 560 can multiplex (because at most one Marco performs data read operation per clock cycle) the read data returned by memory bank Marco 0~3 (the data returned by Marco 0~3 correspond to RDATA_0 [63:0], RDATA_1[63:0], RDATA_2[63:0], RDATA_3[63:0] in the figure) for multiplexing, and return to the read control module. The read control module 541 can return the read data to the master (utilize channels other than the five AXI channels shown on the left side of FIG. 5).

In the process of AXI data transfer, when the data bit width in this transfer is smaller than the data bit width of the channel itself, it is called narrow bit width transfer, or narrow transfer. In the narrow bit width write transfer, the master needs to inform the slave which bytes in the data channel are valid, and it needs to use the WSTRB signal in the write data channel. A single bit in the WSTRB signal is set, indicating that the byte at the corresponding position is valid. For example, in the implementation of transmitting 64 bits (that is, 8 bytes) per beat, the WSTRB signal corresponds to 8 bits, and the bit value of a corresponding bit is used to indicate that the corresponding byte is valid. For example, when the value of the WSTRB signal is ff, it indicates that all 8 bytes are valid for aligned writing, and when the value is 0f, it indicates that the first 4 bytes of the currently written 8-byte data are invalid. In a read transfer, the operation logic of the slave is the same as that of the master in a write transfer, but the slave does not have a signal like WSTRB.

The AXI protocol supports address unaligned transfer, allowing the first byte address of a burst (that is, the start address) to be misaligned with the burst bit width. Therefore, pad data can be added to the first data transfer, the first transfer is padded to alignment, and the pad data is marked as invalid using the WSTRB signal.

Thus, in a preferred embodiment, the memory operation method (preferably the memory access management method) of the present disclosure is decoded by aligning the lowest two addresses of 64 bit, i.e. addr[4:3], thereby realizing simultaneous access to consecutive read and write addresses. When the read and write addresses are discontinuous and the lowest two addresses aligned to 64 bit do not conflict, they can be accessed in parallel. When the address conflicts, the read is usually not affected, and the write can also be accessed in parallel with the read after being blocked for a beat.

The minimum unit of arbitration of each arbitration sub-unit shown in FIG. 5 is a transfer, that is, each transfer performs arbitration. In one embodiment, arbitration can be conducted based on the following arbitration rules:

When there is no read/write response in the previous beat, then when there is a read transfer request or a write transfer request in this beat, the read or write transfer request for this beat will be responded;

When there is no read/write response in the previous beat, then when there is a read transfer request and a write transfer request in this beat, the read transfer request will be responded in this beat;

When in the previous beat read has been responded, then in this beat the write transfer has high priority; similarly, when in the previous beat the write transfer has been responded, then in this beat, the read transfer has high priority.

In addition, when a write transfer in the current clock cycle is an unaligned write that requires at least a first and a second clock cycles to complete, the write address decoder delays the subsequent write transfer by one clock cycle; and/or in the current clock cycle when there is a read transfer and a non-aligned write transfer in its first clock cycle for the same memory bank, the arbitration circuit arbitrates the read transfer first; when there is a read transfer and a non-aligned write transfer in its second clock cycle for the same memory bank, the arbitration circuit arbitrates the unaligned write first.

Preferred implementation examples of the present disclosure will be described below with reference to AXI timing diagram 7-11.

Figure 7:
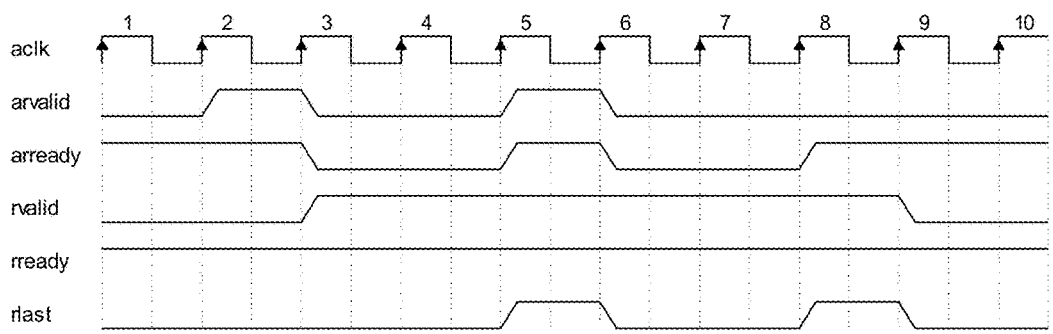
FIG. 7 shows an example of a timing diagram for AXI reading according to the present disclosure.

FIG. 7 shows an example of an AXI read timing diagram in accordance with the present disclosure. The AXI read channel receives a burst instruction including two INCR3 (that is, read the data of 3 memory units with consecutive logical addresses starting from the specified start address, that is, the current transaction includes 3 transfers).

Aclk indicates the bus clock. The master (for example, CPU) gives an arvalid signal on the read address channel (RADDR channel), and the slave (for example, the memory of this disclosure) gives an arready signal on the read address channel. Both signals are high at the same time (on the rising edge of the second beat) indicates that the read address channel handshake is successful.

In the third beat, the memory pulls rvalid high to indicate that the read data is ready. Since there is no write request at the same time, the arbitration circuit directly responds to the read request in the arbitration, so three transfers (in the RDATA channel) are completed in the 3rd to 5th beats, and in the 5th beat, rlast is pulled high to give the signal that the first INCR3 execution is completed.

At the same time, at the 5th beat, the handshake for the next transaction is performed on the read address channel (RADDR channel), and 3 transfers are completed on the RDATA channel at the 6th-8th beat (since there is no write request at the same time, the arbitration circuit directly responds to the read request in the arbitration), and at the 8th beat, rlast is pulled high to give a signal that the second INCR3 is completed. Meanwhile, rvalid is set until the burst is completed.

Figure 8:
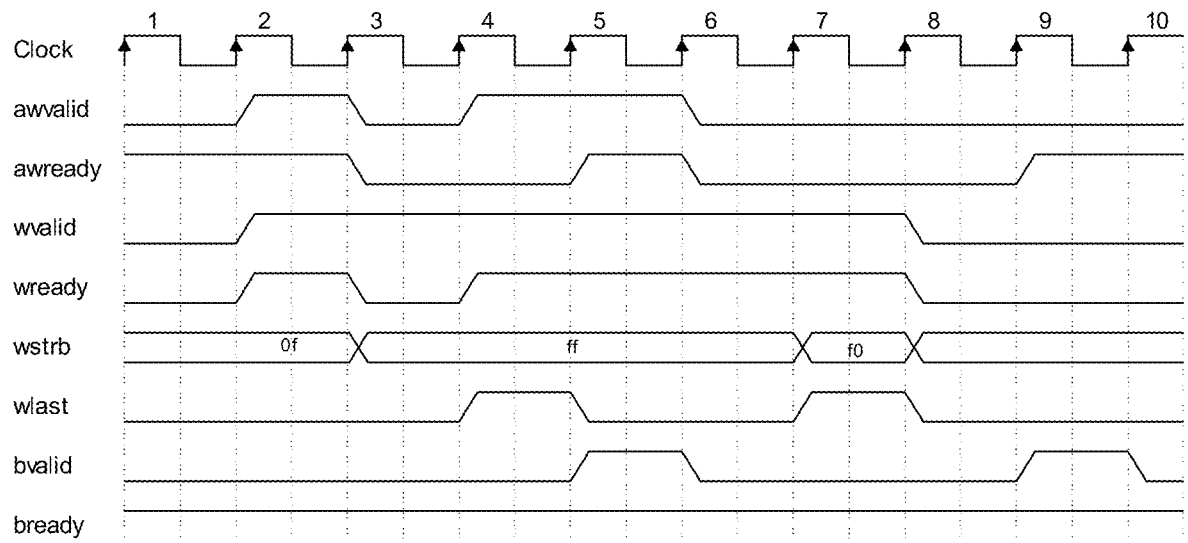
FIG. 8 shows an example of a timing diagram for AXI writing according to the present disclosure.

FIG. 8 shows an example of an AXI write timing diagram in accordance with the present disclosure. A burst instruction including INCR2+INCR3 is received on the AXI write channel (WADDR).

Clock indicates the bus clock. The master (for example, CPU) gives the awvalid signal on the write address channel (WADDR channel), and the slave (for example, the memory disclosed in this disclosure) gives the awready signal on the write address channel. Both signals are high at the same time (the rising of the second beat edge) indicates that the write address channel handshake is successful. Because in the second beat, the memory pulls wvalid high to indicate that the write data is ready, and the master also sets wready high, so the handshake of the write data channel (WDATA) is completed at the same time on the rising edge of the second beat.

AXI write requests are usually "aligned writes" in units of 64 bit, corresponding to wstrb as ff. When wstrb has other values, it indicates that only part of the currently transmitted 64 bit (8 bytes) data is valid, that is, 0f of the 2nd beat and f0 of the 7th beat in the figure indicate that only part is valid of the unaligned write.

When the memory has the ECC function, the ECC encoding will only rewrite certain bits, but the 64 bit needs to be re-encoded as a whole, and it needs to be read-modified-written. Therefore, when wstrb indicates unaligned, because the interface of a Macro port is serial, it cannot be read and written at the same time, so an extra beat is required for processing.

As shown, the data starts to be transmitted when the two channels handshake successfully in the second beat. But because the wstrb value of the second beat is 0f (meaning that only the last 4 bytes are valid, that is, only the data of the lower 4 bytes needs to be rewritten), so wready is pulled down in the third beat (because when the memory supports the ECC function, then unaligned writing needs to be read-modified-written, and this process requires two beats), and in the fourth beat, the second transfer in INCR2 is transmitted. Meanwhile, in the fourth beat, wlast is pulled high to give the signal that the first INCR2 execution is completed.

On the rising edge of the 5th beat, the two channels handshake successfully and the first transfer for INCR3 starts. Since the wstrb value of the 5th and 6th beat is ff (meaning aligned write), the transfer is completed in its current beat; while the wstrb value in the 7th beat is 10 (meaning that only the first 4 bytes are valid), so wready is pulled down in the 8th beat (similarly, because the memory supports the ECC function, unaligned write needs two beats to realize the read-re-writing process), and complete the transmission of the third transfer in INCR3 at the 8th beat. Since wlast is given by the master and pulled high at the beginning of the last transfer, it is pulled high at the 7th beat at the beginning of the third transfer. bvalid is the handshake signal given by the slave on the write reply (WRESP) channel. It is usually set immediately after wlast (for example, the 5th beat). When the transfer of wlast is unaligned, it will be the second beat after wlast set (for example, the $9^{th}$ beat). The master's bready on the write reply (WRESP) channel is always high, indicating that the current transaction has been completed, and the master is ready to start sending the next write command after bvalid is high. avalid beat can shake hands with axvalid, because the SRAM Macro is in an idle state at this time. Since there is no read request at the same time, the arbitration circuit directly responds to the write request in arbitration.

Figure 9:
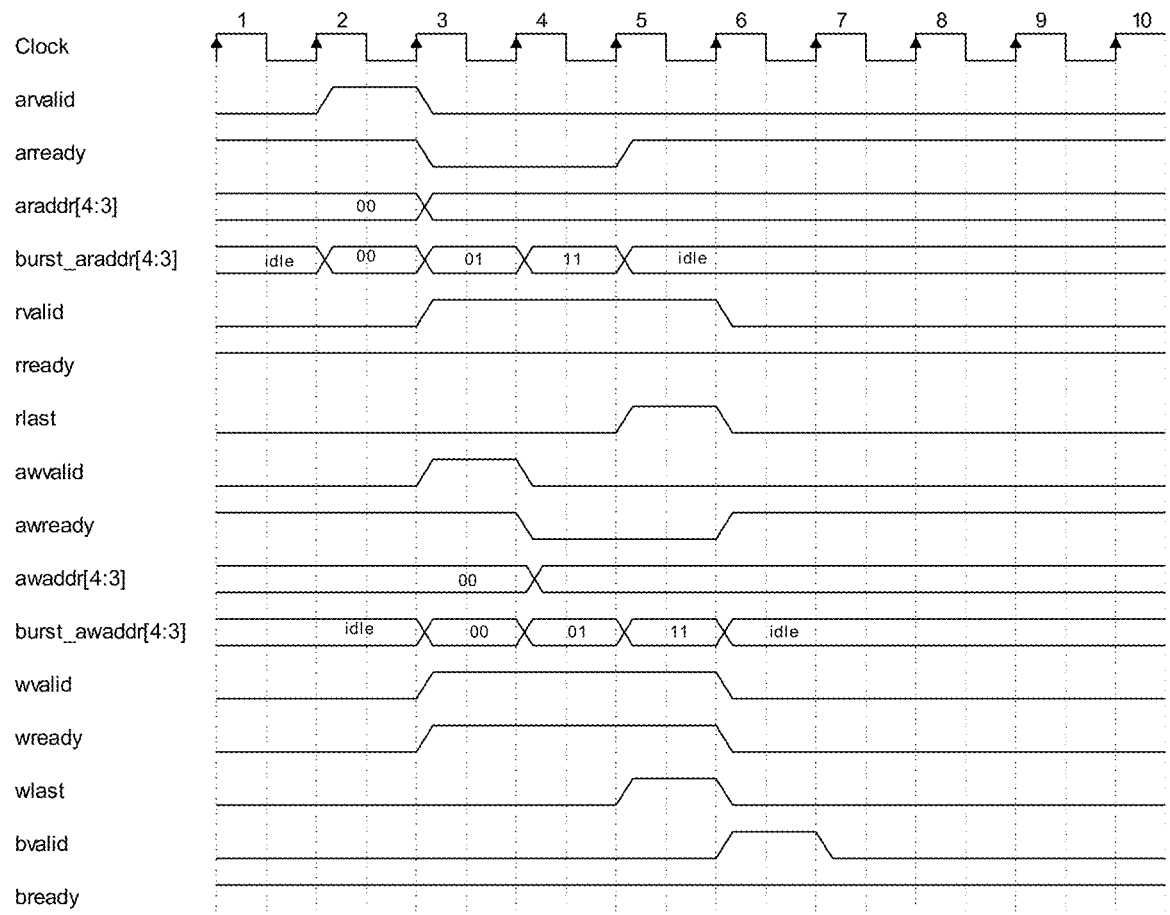
FIG. 9 shows an example of a timing diagram for AXI parallel reading and writing according to the present disclosure.

FIG. 9 shows an example of a timing diagram for AXI parallel reading and writing according to the present disclosure. Each arbitration sub-circuit directly arbitrates a read request and a write request responded by the corresponding memory bank. It is worth noting that a read-write conflict will occur when a read request and a write request perform on the same memory bank at the same beat.

In the figure, araddr[4:3] indicates the start address sent on the RADDR channel after the master and the slave complete the handshake on the RADDR channel via arvalid and arready, in which the specific low address bits of the logical address [4:3] is 00, corresponds to Macro 0. Since there is no write instruction in the second beat, the read request sent by the read transfer request decoder 521 can be arbitrated pass by arbiter 0, the RD0-ack signal sent by arbiter 0 can be received by sub-controller 0 of Macro 0, and the first transfer is completed. burst-araddr indicates the address of the internal burst increment of the memory. This operation can be completed by the read control module (according to the feedback signal of the bus and read-write arbitration), and sends a read request to arbiter 1 in the third beat.

Meanwhile, in the third beat, awaddr[4:3] indicates the start address sent on the WADDR channel after the master and the slave complete the handshake on the WADDR channel via awvalid and awready, in which the specific low address bit of the logical address [4:3] is 00, corresponding to Macro 0, so the write transfer request decoder 522 sends a write request to arbiter 0.

Meanwhile, since arbiter 0 only receives a write request and arbiter 1 only receives a read request, arbiter 0 sends a WR0-ack signal to sub-controller 0 of Macro 0, and arbiter 1 sends a RD1-ack signal to sub-controller 1 of Macro 1, so as to realize the simultaneous execution of the second transfer for the read transaction and the first transfer for the write transaction in the third beat.

Similarly, in the 4th beat (burst-awaddr indicates the address of the internal burst increment of the memory, which can be completed by the write control module according to the feedback signal of the bus and read and write arbitration), the memory banks targeted by the read operation and write operation are staggered so that reads and writes can be performed simultaneously.

The read operation is completed in the 4th beat, and the read control module sends the rlast signal to indicate the completion of the read transaction in the 5th beat (that is, to indicate that the read channel is ready to receive a new read command). The write operation completes the third transfer in the 5th beat, the master sends the wlast signal in the 5th beat, and the slave generates a bvalid valid signal on the write reply channel in the 6th beat, indicating that the write channel is ready to receive new write commands.

Figure 10:
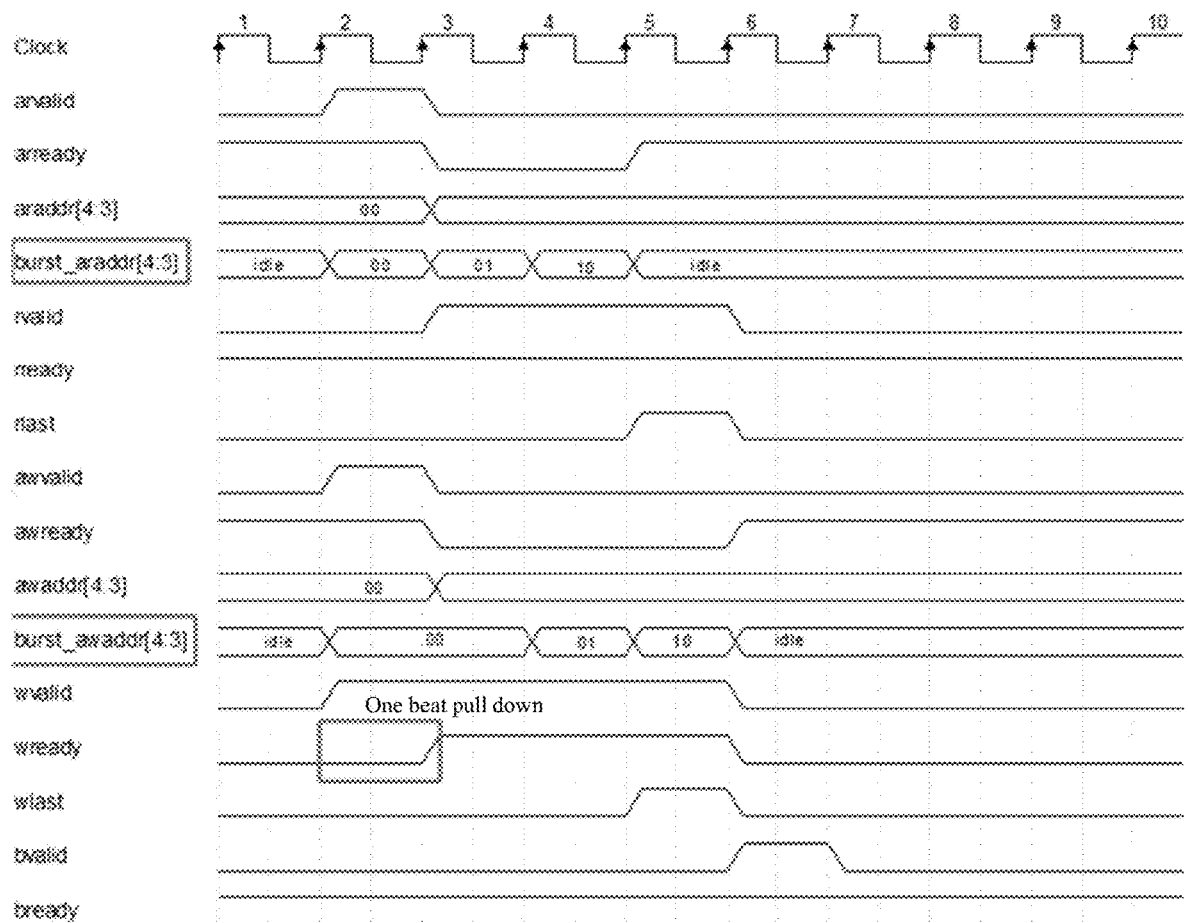
FIG. 10 shows an example of a timing diagram for AXI parallel reading and writing according to the present disclosure.

FIG. 10 shows an example of a timing diagram for AXI parallel reading and writing according to the present disclosure. In the example of FIG. 10, a read-write conflict occurs, and subsequent parallel read-write operations are completed by delaying the write request by one beat.

Similar to FIG. 9, araddr[4:3] in FIG. 10 indicates the start address sent on the RADDR channel after the master and the slave complete the handshake on the RADDR channel via arvalid and arready, in which the specific low address bits of the logical address [4:3] is 00, corresponding to Macro 0. Therefore, in second beat, the read transfer request decoder 521 sends a read request to arbiter 0.

The difference from FIG. 9 is that in the second beat of FIG. 10, awaddr[4:3] indicates the start address sent on the WADDR channel after the master and the slave complete the handshake on the WADDR channel via awvalid and awready respectively, in which the specific low address bits of the logical address [4:3] is 00, corresponding to Macro 0, so the write transfer request decoder 522 sends a write request to arbiter 0.

Meanwhile, arbiter 0 arbitrates the read request and write request that occurred in the second beat. Since there is no response in the previous beat, in the current beat thee read first, and the RD0-ack signal sent by arbiter 0 is received by sub-controller 0 of Macro 0. And the first transfer of the read transfer transaction completes.

Since arbiter 0 has arbitrated read first in the second beat, the aw handshake beat will lower wready by one beat. In the third beat, the read request starts to operate on Marco 1, and the write control module re-sends the above write request for Macro 0, and makes the write transfer request decoder 522 still issue a write request for Macro 0 (corresponding to the burst-awaddr[4:3] is still 00 in the third beat), so by delaying the write request by one beat in the second beat, the low bits of the write address in each subsequent beat can be behind the read address, thus stagger read and write.

Figure 11:
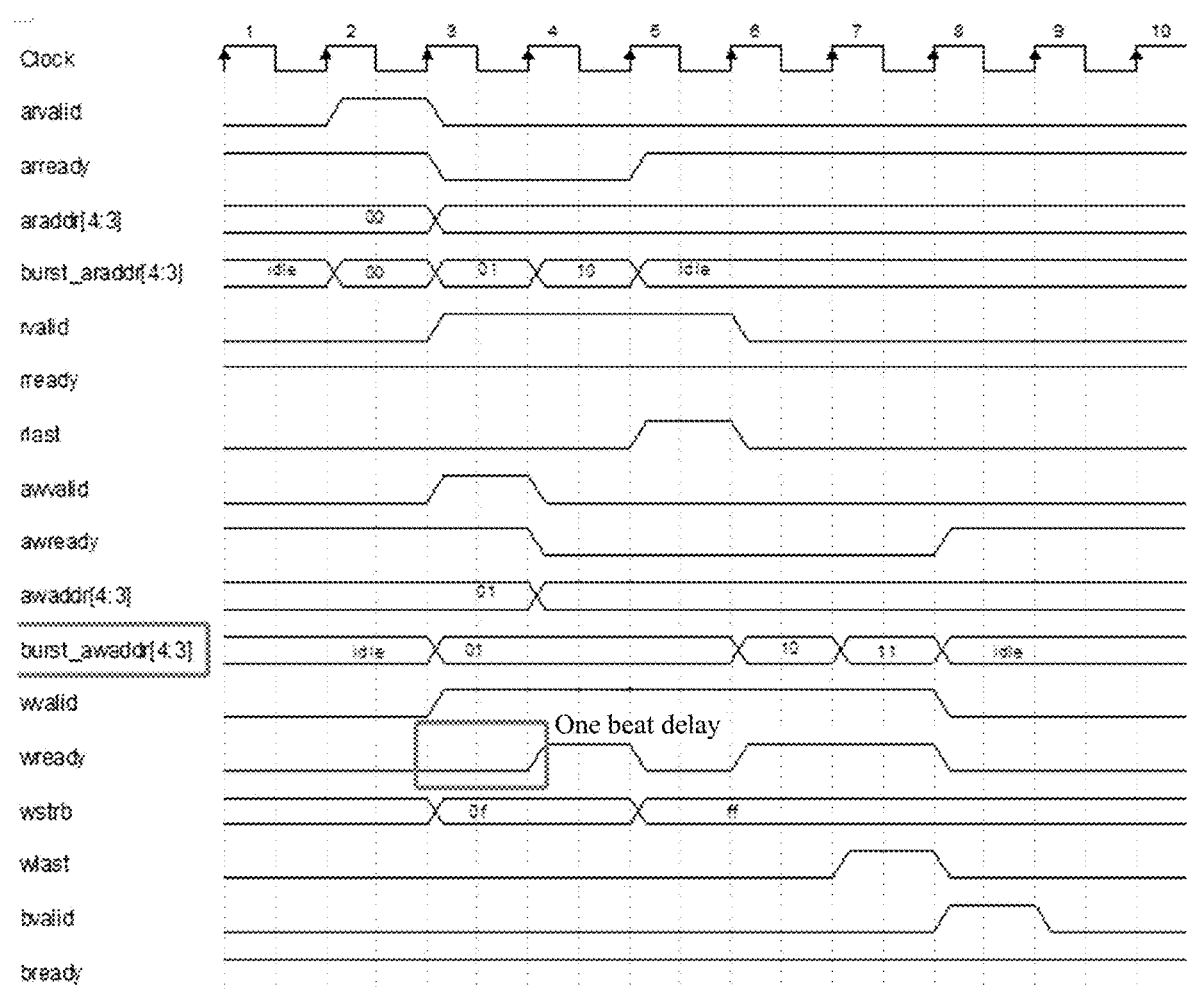
FIG. 11 shows an example of a timing diagram for AXI parallel reading and writing according to the present disclosure.

FIG. 11 shows an example of a timing diagram for AXI parallel reading and writing according to the present disclosure. In the example of FIG. 11 a read-write conflict occurs, and there is a more complex case of write operations being delayed due to unaligned writes.

Similar to FIG. 9 and FIG. 10, araddr[4:3] in FIG. 11 indicates the start address sent on the RADDR channel after the master and slave respectively complete the handshake via arvalid and arready on the RADDR channel, in which the specific low address bits of the logical address [4:3] is 00, corresponding to Macro 0. Therefore, in beat 2, the read transfer request decoder 521 sends a read request to arbiter 0.

Since there is no write instruction in the second beat, the read request sent by the read transfer request decoder 521 can be arbitrated pass by arbiter 0, and the RD0-ack signal sent by arbiter 0 is received by sub-controller 0 of Macro 0, and the first transfer is completed. burst-araddr indicates the address of the internal burst increment of the memory, and this operation is completed by the read transfer request decoder 521, and sends a read request to arbiter 1 in the third beat.

The difference from FIG. 9 and FIG. 10 is that in FIG. 11, in the third beat, awaddr[4:3] indicates the start address sent on the WADDR channel after the master and the slave respectively complete the handshake on the WADDR channel via awvalid and awready, in which the specific low address bits of the logical address [4:3] is 01, corresponding to Macro 1, so the write transfer request decoder 522 sends a write request to arbiter 1.

Meanwhile, arbiter 1 arbitrates the read request and write request that occurred in the third beat. Since there is no arbitration response in the previous beat, the current beat the read first. Then arbiter 1 arbitrates the read first, and the sent RD1-ack signal is received by the sub-controller 1 of Macro 1, and the second transfer of the read transaction is completed. Meanwhile, arbiter 1 will notify the write control module 542 through a signal, and the write control module 542 will pull down wready for one beat, and resume the write request to Macro 1 in the fourth beat, and extend wstrb to 0f for one beat. Although there is no conflict with the read operation at this time (the read operation has been incremented to the third transfer for Macro 2), but because wstrb is 0f, indicating an unaligned operation, wready is pulled down again in the fifth beat, and resume processing for the next transfer (i.e., the second transfer) of the write transfer transaction in the sixth beat. Therefore, the read operation has ended, and the value of wstrb is ff, so the data writing of the second and third transfer of the write transfer transaction is successfully completed in the sixth and seventh beats. The master sends out the wlast signal when sending the data corresponding to the last transfer in the seventh beat. Since the transfer data is aligned, the slave sends out the bvalid signal in the eighth beat, indicating that the write channel is idle.

The memory operation method and memory according to the present disclosure have been described in detail above with reference to the accompanying drawings.

The present disclosure staggers the memory banks targeted by the read/write increment address through low address decoding, thereby improving the execution efficiency of the read-write parallel protocol, and deals with read-write conflicts through arbitration. The operation solution disclosed in the present disclosure is especially suitable for the memory following the AXI protocol, and transfer-by-transfer arbitration is preferred to maximize memory access efficiency.

The present disclosure can also be implemented as an electronic device, the electronic device includes a host and a memory, and the host and the memory communicate in accordance with a read-write parallel protocol, such as a master and a slave of the AXI protocol. The memory can perform the above-mentioned operation method, avoid the multi-cycle occupation of a certain memory bank by continuous address reading or writing through low address decoding, and maximize the improvement of memory access efficiency by introducing an arbitration mechanism, especially transfer-by-transfer arbitration.

The memory of the present disclosure is particularly suitable for implementation as on-chip memory, such as on-chip SRAM.

Having described various embodiments of the present disclosure above, the foregoing description is exemplary, not exhaustive, and is not limited to the disclosed embodiments. Many modifications and alterations will be apparent to those of ordinary skill in the art without departing from the scope and spirit of the described embodiments. The terminology used herein is chosen to best explain the principle of each embodiment, practical application or improvement of technology in the market, or to enable other ordinary skilled in the art to understand each embodiment disclosed herein.

What is claimed is:

1. A memory operation method, the memory follows a read-write parallel protocol and includes a plurality of memory banks, the method comprising:
    sequentially mapping a read transaction for consecutive logical addresses to different memory banks according to a predetermined transmission bit width by a read address decoder;
    sequentially mapping a write transaction for consecutive logical addresses to different memory banks according to the predetermined transmission bit width by a write address decoder; and
    arbitrating the read transaction and the write transaction mapped to the same memory bank in a current clock cycle by an arbitration circuit,
    wherein, in case that specific low address bits of the logical addresses are the same, the read transaction and/or the write transaction are mapped to the same memory bank.

2. The method of claim 1, wherein, each read transaction comprises a plurality of read transfers, and each write transaction comprises a plurality of write transfers, when the data corresponding to each read transfer or write transfer needs to be transmitted, the arbitration circuit arbitrates the read transfer and the write transfer mapped to the same memory bank in the current clock cycle.

3. The method of claim 2, further comprising:
    performing the read transfer or the write transfer based on the arbitration result on the memory bank in the current clock cycle according to the arbitration result.

4. The method of claim 2, wherein, arbitrating the read transaction and the write transaction mapped to the same memory bank in a current clock cycle through an arbitration circuit comprising:
    arbitrating one of the read transfer or the write transfer first by the arbitration circuit, and delaying the non-first transfer for a transmission time for transmitting data corresponding to the predetermined transmission bit width.

5. The method of claim 4, wherein arbitrating one of the read transfer or the write transfer first by the arbitration circuit, and delaying the non-first transfer for a transmission time for transmitting data corresponding to the predetermined transmission bit width comprising:
    notifying the read control module or write control module corresponding to the non-first transfer of the arbitration result by the arbitration circuit; and
    re-sending the non-first transfer by the read control module or the write control module corresponding to the non-first transfer in a next transmission time for transmitting data corresponding to a predetermined transmission bit width.

6. The method of claim 2, wherein, arbitrating the read transaction and the write transaction mapped to the same memory bank in a current clock cycle by an arbitration circuit comprising:
    when there is a read transfer and a write transfer for the same memory bank in the current clock cycle, the arbitration circuit arbitrates the read transfer first.

7. The method of claim 2, wherein, arbitrating the read request and the write request mapped to the same memory bank in a current clock cycle through an arbitration circuit comprising:
    when there is a read transfer and a write transfer for the same memory bank in the current clock cycle, the arbitration circuit arbitrates the transfer that is of a different type from the transfer in the previous clock cycle first.

8. The method of claim 1, wherein, the memory bank to be mapped is determined according to the value of the specific low address bit of the logical address, wherein a lowest bit of the specific low address bit is determined according to the predetermined transmission bit width, the number of bits of the specific lower address bits is determined according to the number of the memory banks.

9. The method of claim 2, wherein the predetermined transfer bit width corresponds to the bus physical width of the read-write parallel protocol, and the arbitration circuit arbitrates for each read transfer and each write transfer in each memory bank.

10. The method of claim 9, wherein sequentially mapping a read transaction for consecutive logical addresses to different memory banks according to a predetermined transmission bit width by a read address decoder comprising:
   determining the memory bank to be accessed according to the value of the specific low address bit of a start address in the read transaction by the read address decoder;
   according to read transfer length information contained in the read transaction, incrementally determine the memory bank to be accessed by the subsequent read transfers one by one;
   wherein sequentially mapping a write transaction for consecutive logical addresses to different memory banks according to the predetermined transmission bit width by a write address decoder comprising:
   determining the memory bank to be accessed according to the value of the specific low address bit of a start address in the write transaction by the write address decoder;
   according to write transfer length information contained in the write transaction, incrementally determine the memory bank to be accessed by the subsequent write transfers one by one,
   wherein each read transfer and each write transfer corresponds to one of the logical addresses.

11. The method of claim 10, wherein, when the write transfer is arbitrated first in the current clock cycle, in the next clock cycle, the read address decoder re-sends the read address of the non-first read transfer, and the read control module re-performing the read operation of the non-first read transfer; and
   when the read transfer is arbitrated first in the current clock cycle, in the next clock cycle, the write address decoder re-sends the write address of the non-first write transfer, and the write control module re-performing the write operation of the non-first write transfer.

12. The method of claim 10, wherein the write address decoder delays subsequent write transfers one clock cycle when the write transfer of the current clock cycle is an unaligned write transfer requiring at least two clock cycles to complete; and/or
   when there is a read transfer and an unaligned write transfer in its first clock cycle for the same memory bank in the current clock cycle, the arbitration circuit arbitrates the read transfer first;
   when there is a read transfer and an unaligned write transfer in its second clock cycle for the same memory bank in the current clock cycle, the arbitration circuit arbitrates the unaligned write transfer first.

13. A memory, the data access of the memory follows a read-write parallel protocol, and the memory includes:
   a plurality of memory banks;
   a read address decoder, configured to sequentially map a read transaction for consecutive logical addresses to different memory banks according to a predetermined transmission bit width;
   a write address decoder, configured to sequentially map a write transaction for consecutive logical addresses to different memory banks according to the predetermined transmission bit width;
   an arbitration circuit, configured to arbitrate the read request and the write request mapped to the same memory bank in the current clock cycle, wherein, in case that specific low address bits of the logical addresses are the same, the read request and/or the write request are mapped to the same memory bank.

14. The memory of claim 13, wherein each read transaction comprises a plurality of read transfers, and each write transaction comprises a plurality of write transfers, the predetermined transfer bit width corresponds to the bus physical width of the read-write parallel protocol.

15. The memory of claim 13, wherein the arbitration circuit comprises:
   a plurality of arbitration sub-circuits corresponding to the plurality of memory banks one by one,
   wherein, each arbitration sub-circuit arbitrates in its corresponding memory bank for each read transfer and each write transfer.

16. The memory of claim 13, comprising:
   a read control module and a write control module, and the arbitration circuit is configured to:
   arbitrate one of the read transfer or the write transfer first; and
   notify the read control module or write control module corresponding to the non-first transfer of the arbitration result;
   wherein the read control module or the write control module corresponding to the non-first transfer re-sends the non-first transfer in the next clock cycle.

17. An electronic device comprising:
   A control unit; and
   a memory, wherein the control unit and the memory follow a parallel read-write protocol, and the memory further comprises:
   a read address decoder, configured to sequentially maps a read transaction for consecutive logical addresses to different memory banks according to a predetermined transmission bit width;
   a write address decoder, configured to sequentially map a write transaction for consecutive logical addresses to different memory banks according to the predetermined transmission bit width; and
   an arbitration circuit, configured to arbitrate the read transaction and the write transaction mapped to the same memory bank in the current clock cycle,
   wherein, in case that specific low address bits of the logical addresses are the same, the read transaction and/or the write transaction are mapped to the same memory bank.

18. The electronic device of claim 17, wherein, each read transaction comprises a plurality of read transfers, and each write transaction comprises a plurality of write transfers, when the data corresponding to each read transfer or write transfer needs to be transmitted, the arbitration circuit arbitrates the read transfer and the write transfer mapped to the same memory bank in the current clock cycle.

19. The electronic device of claim 18, wherein the arbitration circuit is configured to:
   arbitrate one of the read transfer or the write transfer first, and delay the non-first transfer for a transmission time for transmitting data corresponding to the predetermined transmission bit width.

20. The electronic device of claim 19, wherein the arbitration circuit is configured to:
   notify the read control module or write control module corresponding to the non-first transfer of the arbitration result; and
   re-send the non-first transfer by the read control module or the write control module corresponding to the non-first transfer in a next transmission time for transmitting data corresponding to the predetermined transmission bit width.

* * * * *